United States Patent [19]
Nguyen et al.

[11] Patent Number: 6,164,922
[45] Date of Patent: Dec. 26, 2000

[54] FLOW CONTROL VALVE FOR A PUMP FOR CONVEYING A MEDIUM

[75] Inventors: Van Doan Nguyen, Neu-Anspach; Peter Breuer, Friedrichsdorf, both of Germany

[73] Assignee: Luk Fahrzeug-Hydraulik GmbH & Co. KG, Bad Homburg, Germany

[21] Appl. No.: 09/242,830

[22] PCT Filed: Jun. 24, 1998

[86] PCT No.: PCT/EP98/03850

§ 371 Date: Feb. 24, 1999

§ 102(e) Date: Feb. 24, 1999

[87] PCT Pub. No.: WO98/59172

PCT Pub. Date: Dec. 30, 1998

[30] Foreign Application Priority Data

Jun. 24, 1997 [DE] Germany ............... 297 23 412 U

[51] Int. Cl.$^7$ .................................................. F04F 5/44
[52] U.S. Cl. .............................. 417/198; 137/37; 137/42
[58] Field of Search ........................... 417/79, 88, 176, 417/198; 138/37, 39, 42

[56] References Cited

U.S. PATENT DOCUMENTS

| | | | |
|---|---|---|---|
| 676,239 | 6/1901 | Labadie | 417/176 |
| 1,494,351 | 5/1924 | Gillard | 138/42 |
| 2,803,116 | 8/1957 | Tilney | 62/126 |
| 3,736,072 | 5/1973 | Turner et al. | 417/79 |
| 3,922,113 | 11/1975 | Turner | 417/79 |
| 4,347,047 | 8/1982 | Shiozawa . | |
| 4,989,807 | 2/1991 | Foreman et al. | 244/53 |

FOREIGN PATENT DOCUMENTS

| | | |
|---|---|---|
| 0125328 | 11/1984 | European Pat. Off. . |
| 0151657 | 8/1985 | European Pat. Off. . |
| 4438696 | 5/1996 | Germany . |

*Primary Examiner*—Charles G. Freay
*Attorney, Agent, or Firm*—Ostrolenk, Faber, Gerb & Soffen, LLP

[57] ABSTRACT

A pump for conveying a medium, in particular hydraulic oil, comprising a flow-control valve for controlling the flow of medium conveyed by the pump and a discharge channel (7) releasable by the flow-control valve. In order to prevent cavitation, a flow divider (17) is provided for dividing the discharge jet flowing into the discharge channel (7) and extends into the said discharge channel (7), and is spaced by a distance (a) from an orifice (9) of the discharge channel (7) facing the flow-control valve.

19 Claims, 1 Drawing Sheet

FLOW CONTROL VALVE FOR A PUMP FOR CONVEYING A MEDIUM

This application is a national stage filing under 35 U.S.C. § 371 of PCT/EP98/03580 filed Jun. 24, 1998.

BACKGROUND OF THE INVENTION

The invention relates to a pump for conveying a medium, in particular hydraulic oil, and comprising a flow controller for controlling the flow of medium conveyed by the pump through a discharge channel releasable by a flow-control valve.

Such pumps are known and are used, for example, in motor vehicles for power-steering and/or brake-servo systems as well as for hydraulic suspension systems or the like. This involves pumps which are driven directly by the internal-combustion engine and which thus have a volume flow variable as a function of the rotational speed of the engine or a conveying capacity dependent upon the rotational speed. In those cases in which the consumer connected to the pump requires only a specific maximum volume flow, a flow-control valve is provided which limits the flow of medium delivered by the pump to the consumer. If the conveying capacity of the pump exceeds the maximum volume flow, the flow-control valve opens a discharge channel, by way of which the medium conveyed by the pump flows back to the suction side of the pump. It has been found that in many cases damage is caused at high rotational speeds by cavitation. In addition, there is an irregular suction performance of the pump.

SUMMARY OF THE INVENTION

An object of the invention is to provide a pump as described which does not have this drawback.

The invention provides a pump for conveying a medium and comprising a flow controller for controlling the flow of medium conveyed by the pump, the flow controller comprising a discharge channel releasable by a flow-control valve, a flow divider for dividing the discharge jet flowing into the discharge channel and extending into the discharge channel, the flow divider being spaced from an orifice of the discharge channel facing the flow-control valve. In this way it is possible to prevent the adverse effects of cavitation almost completely.

Preferably, the flow divider is constructed as a moulded part which is provided with an incident-flow projection. The discharge jet released by the flow-control valve strikes the incident-flow projection at high speed and can be deflected thereby in such a way that cavitation can be virtually eliminated. It is thus possible to prevent damage by cavitation in a simple manner.

In a further embodiment of the pump the flow divider is constructed in the form of a pin which is preferably cylindrical and which is arranged in such a way that it is struck by the discharge jet. Other objects and features of the outer face of the pin are used to deflect the discharge jet. In this way, drawbacks resulting from cavitation can be prevented in a simple and inexpensive manner.

BRIEF DESCRIPTION OF THE DRAWINGS

The invention is explained in greater detail below with reference to the accompanying drawing, in which.

DESCRIPTION OF A PREFERRED EMBODIMENT

Figure 1:
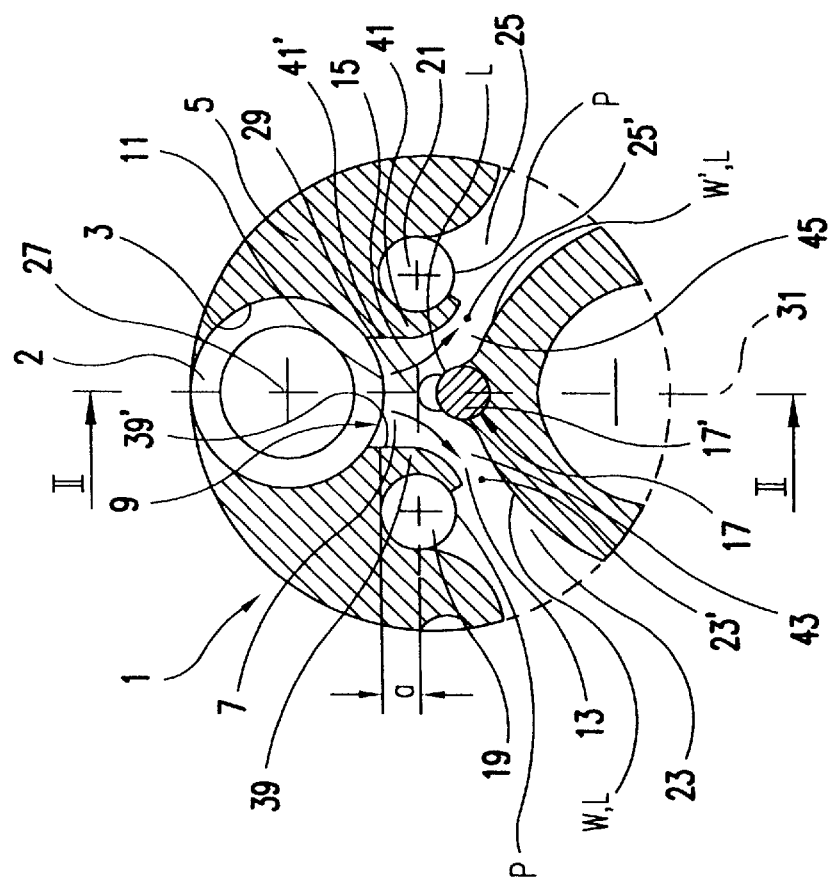
FIG. 1 is a cross-section through an area of a pump.

The sectional illustration in FIG. 1 shows a cut-away view of a flow controller for a pump 1 provided with a flow-control valve arranged at a right angle to the plane of FIG. 1 and situated in a suitable valve bore 3 in housing 5 of the pump 1. The valve bore 3 is intersected by a discharge channel 7 which is, for example, also formed by a bore. It is also possible to form the discharge channel 7 during casting when manufacturing the housing 5.

A discharge edge 11, which is covered by a flow-control piston (not shown) of the flow-control valve in one operating position and is released in another operating position, is formed in the region of the orifice 9 of the discharge channel 7 opening into the valve bore 3.

The operation of a flow-control valve is known in principle, so that only the following will be noted here: The flow-control piston of the flow-control valve closes the discharge channel 7 in the stationary state of the pump and also in a first operating phase in which the desired volume flow for a consumer has not yet been reached. The flow-control piston is acted upon by the pressure produced by the pump and also by a spring force. The spring force is set in such a way that above the desired volume flow the discharge channel 7 or the discharge edge 11 is released, so that the medium conveyed by the pump under high pressure flows into the discharge channel 7.

Two arrows 13 and 15 show that the discharge jet flowing into the discharge channel 7 is divided into two parts. This division is made by a flow divider 17, which projects into the discharge channel 7 and is arranged at a distance a from the discharge edge. The discharge jet flowing into the discharge channel 7 passes along the outer face of the flow divider 17, issues from the discharge channel 7 and finally arrives at the suction area of the pump 1 (not shown).

The parts of the jet issuing from the discharge channel 7 are here guided past two tank openings 19 and 21, i.e. orifices of duct portions which are connected to the tank of the pump 1. After the parts of the jet flow past the flow divider 17, they enter duct portions 23 and 25, the diameter of which is larger than the region in which the parts of the jet flowed past the flow divider 17. An injector effect is thus produced here, so that the parts of the jet draw medium present in the tank out of the tank openings 19 and 21 and thus ensure an optimum charging of the suction area of the pump 1. An additional aim is to narrow the partial areas 23' and 25' just in front of the tank openings 19 and 21, in order to increase the speed of the parts 13 and 15 of the jet. In this way, an even better injector effect can be achieved.

In the embodiment of the pump 1 illustrated here, injector effects of this type are associated with the two parts of the discharge jet indicated by the arrows 13 and 15, since the two parts of the jet flow in duct portions 23 and 25 with a larger flow cross-section.

FIG. 1 indicates by hatching that the flow divider 17 may be constructed in the form of a cylindrical pin, the median axis of which in this case extends parallel to the notional median axis 27 of the valve bore 3. It is also possible, however, for the pin or flow divider 17 to extend at an angle to the median axis 27. It is essential that the flow divider 17 is arranged in the discharge channel 7 and is spaced from the discharge edge 11, in order to ensure that the discharge jet is divided into two parts, as indicated here by the arrows 13 and 15.

FIG. 1 shows in broken lines that the flow divider 17 may also be constructed in the form of a moulded part, the shape of which differs from a cylindrical pin and which has an incident-flow projection 29 arranged at a distance a from the discharge edge 11. A moulded part of this type can have an outer face which is parabolic in a further approximation and by which the parts of the discharge jet indicated by the arrows 13 and 15 are deflected away from a notional median axis 31, so as to result in a division of the discharge jet. The wall areas W and W', which □ situated downstream of the discharge edge 11 □ adjoin the flow divider 17 and which deflect the parts of the jet and bound the duct portions 23 and 25, are curved in such a way the parts of the jet are deflected in a manner free of cavitation. In this way, the flow divider 17 is part of a baffle surface L which deflects the parts of the jet cleanly. The baffle surface L thus includes the wall areas W and W' as well as the face of the flow divider 17 which joins the two wall areas W and W' to each other as it were. If the flow divider is constructed in the form of a pin 17', part of the outer surface thereof forms part of the baffle surface L. If the flow divider 17 is constructed in the form of a moulded part with the incident-flow projection 29, this incident-flow projection 29 likewise forms part of the baffle surface L which joins the two wall areas W and W' to each other.

It is clear from FIG. 1 that the flow divider 17 is arranged in the flow duct 7 in the vicinity of the discharge edge 11 in such a way that the discharge jet released by the flow-control valve, as indicated by the two arrows 13 and 15, is divided and deflected. The outer face of the flow divider 17 causes the parts of the jet to be deflected outwards from the median line 31 in such a way that cavitation is practically eliminated. As already mentioned, a particularly simple embodiment of the flow divider 17 may be a cylindrical pin, which preferably consists of hard metal. It is also possible to use a moulded part with an incident-flow projection 29 which extends further into the flow duct 7 and results in a simultaneous deflexion of the parts of the jet.

Figure 2:
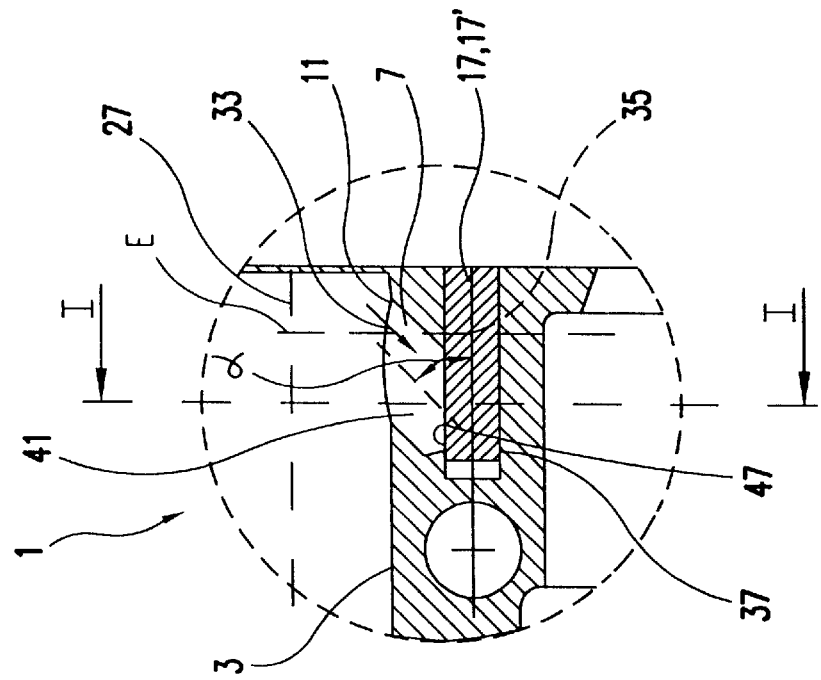
FIG. 2 is a longitudinal section along the line II—II of FIG. 1.

FIG. 2 again is a cut-away view of a pump 1. The same parts are provided with the same reference numerals, so that in this respect reference is made to the description relating to FIG. 1. In FIG. 2 a line I—I is shown which indicates the sectional plane reproduced in FIG. 1.

The discharge jet flowing into the discharge channel 7 is indicated by an arrow 33. The flow divider 17 is clearly recognizable, which in this case is constructed in the form of a cylindrical pin, the median axis 35 of which extends parallel to the median axis 27 of the valve bore 3. It is particularly clear from this illustration that the flow divider or cylindrical pin can also form an angle with the median axis 27. What is essential is that the flow divider 17 is arranged inside the discharge channel 7 at a distance from the discharge edge 11 and thus causes the discharge jet to be divided in an optimum manner.

The division of the discharge jet ensures that cavitation is prevented by the parts of the jet flowing uniformly. In addition, the parts of the jet indicated by the arrows 13 and 15 can flow past the two tank openings 19 and 21 in such a way that a suction effect occurs, as a result of which the medium conveyed by the pump is drawn out of the tank connected to the tank openings 19 and 21. This ensures satisfactory filling of the pump 1 in the suction area, so that here too cavitation damage can be practically eliminated.

It has been found that the flow divider 17 produces a uniform distribution of the discharge jet or the controlled oil flow and thus assists the injector effect of the pump. This makes it possible to increase the maximum rotational speed of the pump significantly above rotational speeds which could be achieved with known pumps (9000 r.p.m. at from 1 to 2 bar).

At the same time it has also been found that the flow divider 17 can be produced in a simple and thus inexpensive manner. It is also possible, as may be seen in FIGS. 1 and 2, to arrange the flow divider inside the discharge channel close to the discharge edge, so that the following wall areas W and W' make possible a relatively long deflection path inside which the parts of the jet can be deflected in a clean manner.

The flow divider 17 can be cast into the housing 5 of the pump 1 during the production of the pump 1. It is also preferably possible, however, for the flow divider to be designed as a separate component, and this simplifies the production of the pump. In this way, the manufacture of the flow divider 17 is also simple and inexpensive. It is even possible to re-equip existing pumps with a flow divider of the type described here, i.e. to form a bore 37 in the housing 5 of an existing pump and to insert therein a cylindrical pin acting as the flow divider 17. In this case it is also possible to insert a flow divider in the form of a moulded part into an existing pump.

In the remarks relating to FIGS. 1 and 2 it was generally assumed that the pump is used for conveying a medium. The use of this pump has been found to be particularly successful in conjunction with conveying an hydraulic oil which is present in a suitable reservoir or tank and which can be drawn into the suction area of the pump 1 by way of the tank openings 19 and 21. Since the discharge jet is guided past the tank openings 19 and 21 by the flow divider 17, the medium present in the reservoir or tank is drawn out and supplied to the suction area of the pump. As already mentioned, it is particularly advantageous if each part of the jet moves past a respective tank opening in each case, in order to ensure a uniform charging of the pump on both sides in a simple manner.

Guide vanes 39 and 41, which bound the discharge channel 7 laterally, are additionally shown in FIG. 1. The guide vanes 39 and 41 extend from the discharge edge 11 and the orifice 9 into the respective duct portions 23 and 25. Starting from the discharge edge 11 the wall portions 39' and 41' of the guide vanes 39 and 41 facing the discharge channel 7 initially extend substantially parallel to the median line 31 and then extend outwards substantially at the level of the flow divider 17 and the incident-flow projection 29, i.e. remote from the median line 31. In a preferred embodiment the wall portions following the substantially vertical wall portions are substantially in the form of a parabola, so that a constriction 43 and 45 is formed in the respective duct portion 23 and 25 between the respective guide vane 39 and 41 and the associated wall area W and W' of the baffle surface L in each case. The speed of the parts of the discharge jet is increased by the constrictions 43 and 45, in which case the respective duct portion 23 and 25 which widens again causes the speed of the parts of the jet to be reduced again. The injector effect is improved by the increased speed of the parts of the jet, so that the suction effect at the tank openings 19 and 21 is increased. As a result, the suction of oil out of the tank is improved.

The guide vanes 39 and 41 are adapted on the outside thereof to the outline of the tank openings 19 and 21, in which case the tank openings 19 and 21 can be circular.

The guide vanes 39 and 41 perform a double function: On the one hand, together with the wall areas W and W' of the baffle surface L they form the above-mentioned constriction 43 and 45, so that the injector effect can be increased; on the other hand the guide vanes 39 and 41 form a barrier for the discharge jet flowing into the discharge channel 7, so that the discharge jet or the parts of the jet cannot enter the tank openings 19 and 21 directly. The injection of oil into the suction connection is thus reliably prevented. In a preferred embodiment it is thus provided that the guide vanes 39 and 41 extend so far into the associated duct portion 23 and 25, or are of such a height, that they surround the corresponding tank opening 19 and 21 substantially to the level of their lowest point P. It is possible, of course, for the guide vanes to terminate shortly in front of or shortly after the point P.

Since the discharge jet or the parts of the jet are guided by the guide vanes 39 and 41 and the flow divider 17 and the baffle surface L, little flow loss occurs. As a result, the power consumption of the pump is also reduced. In addition, less noise occurs. As already mentioned above, the pump 1 can be operated at a higher rotational speed (about 9000 r.p.m.) than in the case of a known pump.

The discharge channel 7 is shown in a side view in FIG. 2. It is clear that the discharge channel 7 extends at an angle α ▫ which in particular can be between 30° and 60° and preferably amounts to 45° ▫ to the median axis 35. The discharge jet is deflected backwards in the direction towards the tank openings 19 and 21 by the discharge channel 7, which extends obliquely to the rear, so that the injector effect occurs directly at the tank openings 19 and 21. In order that the discharge jet cannot flow directly into the tank openings 19 and 21 through the discharge channel 7 extending obliquely to the rear, the guide vanes 39 and 41 are provided. It is thus evident that the injector effect can be further improved by the discharge channel 7 extending obliquely to the rear at an angle α.

The guide vanes 39 and 41 extend in depth, i.e. through the plane of the drawing according to FIG. 1, as far as the associated tank openings 19 and 21. In a preferred embodiment the guide vanes extend forwards, i.e. out of the plane of the drawing, by substantially ¾ beyond the depth of the flow duct, i.e. as shown in FIG. 2, substantially as far as a plane E through which the median axis 35 passes at a right angle. It is also possible, however, for the depth of the guide vanes 39 and 41 to be above the overall depth of the discharge channel 7. The ends or end faces of the guide vanes 39 and 41 can thus coincide with the plane E or be situated to the left or right (FIG. 2) of the plane, depending on the depth of the guide vanes 39 and 41. It is also possible, however, for the said end faces to extend at an angle to the plane E.

Since the depth of the guide vanes 39 and 41 extends substantially from the plane E to the tank openings 19 and 21, no oil can pass directly into the tank openings 19 and 21 from the orifice area 47 facing the flow divider 17, so that the suction effect produced by the injector effect is not impaired. The depth of the guide vanes 39 and 41 can of course be dimensioned in such a way that they cover only the orifice area 47.

It is possible, of course, for a pump I to be provided with only one opening 19 or 21, in particular in the case of one-stroke vane-cell pumps which have only one suction and compression pocket. Accordingly, only one guide vane 39 or 41 is also preferably provided. In a preferred embodiment, however, two tank openings 19 and 21 are provided, with which one of the guide vanes 39 and 41 is then associated in each case.

We claim:

1. A flow controller for controlling the flow of medium conveyed by a pump, the flow controller comprising:

a housing having an axial direction, a valve bore extending in the housing along the axial direction;

a discharge channel in the housing, the discharge channel having an orifice communicating with the valve bore to receive medium therefrom;

a flow divider extending in the axial direction within the discharge channel and spaced from the valve bore and from the orifice, and positioned for dividing the discharge jet of medium flowing into the discharge channel from the valve bore through the orifice into separate flows following the flow divider, and including an incident flow projection positioned for receiving the jet from the orifice.

2. The flow controller of claim 1, wherein the incident flow projection comprises a molded part.

3. The flow controller of claim 1, wherein the projection is in the form of a pin.

4. The flow controller of claim 3, wherein the pin is cylindrical and extends in the axial direction.

5. The flow controller of claim 4, wherein the pin has a longitudinal side which faces the discharge jet.

6. The flow controller of claim 1, wherein the flow divider is a component separate from the housing and installed therein.

7. The flow controller of claim 3, further comprising a duct connected to supply medium and the duct opens in a region of the discharge channel, whereby medium moving through the discharge channel draws medium from the duct into the discharge channel.

8. The flow controller of claim 7, further comprising at least one guide vane extending from the orifice into the discharge channel.

9. The flow controller of claim 8, wherein the guide vane includes a wall with a side facing into the discharge channel.

10. The flow controller of claim 9, wherein the wall side includes a first portion extending from the orifice generally in a direction parallel to a median line of the housing and a second portion extending outward away from the median line below the level of the flow divider in the discharge channel.

11. The flow controller of claim 9, wherein the discharge channel has a second side opposed to the wall side of the guide vane, and the second side and the wall side are shaped and oriented to define a flow constriction for flow of medium in a region of the discharge channel.

12. The flow controller of claim 11, wherein the discharge channel is so shaped as to widen wider than the flow constriction downstream along the flow of medium in the discharge channel.

13. The flow controller of claim 12, wherein the guide vane extends from the orifice substantially to a plane at right angles to the median axis of the pump.

14. The flow controller of claim 13, wherein the guide vane has an end face that extends parallel to or at an angle to the plane.

15. The flow controller of claim 12, wherein the guide vane wraps partially around a communicating end of the duct into the discharge channel.

16. The flow controller of claim 11, wherein the guide vane wraps partially around a communicating end of the duct into the discharge channel.

17. The flow controller of claim 9, wherein the guide vane wraps partially around a communicating end of the duct into the discharge channel.

18. The flow controller of claim 9, wherein the discharge channel is divided into separate sections by the flow divider and there is a respective one of the guide vanes in each of the sections of the discharge channel.

19. The flow controller of claim 18, wherein each side of the discharge channel has a second side opposed to the guide vane, and the second side and the guide vane are shaped and oriented to define a flow constriction for flow of medium in a region of the discharge channel, and each side of the discharge channel is so shaped as to widen wider than the flow constriction downstream along the flow of medium in the discharge channel.

* * * * *